(12) United States Patent
Wlodarczyk

(10) Patent No.: US 7,207,214 B1
(45) Date of Patent: Apr. 24, 2007

(54) GLOW PLUG INTEGRATED PRESSURE SENSOR

(76) Inventor: Marek T. Wlodarczyk, 6865 Vachon Dr., Bloomfield Hills, MI (US) 48301

( * ) Notice: Subject to any disclaimer, the term of this patent is extended or adjusted under 35 U.S.C. 154(b) by 0 days.

(21) Appl. No.: 11/059,920

(22) Filed: Feb. 17, 2005

Related U.S. Application Data

(60) Provisional application No. 60/545,459, filed on Feb. 17, 2004.

(51) Int. Cl.
*G01M 15/00* (2006.01)
(52) U.S. Cl. ............... 73/116; 73/117.2; 73/117.3; 73/118.1; 73/119 R; 73/115
(58) Field of Classification Search ........... 73/116, 73/117.2, 117.3, 118.1, 119 R, 115
See application file for complete search history.

(56) References Cited

U.S. PATENT DOCUMENTS

| | | | | |
|---|---|---|---|---|
| 4,494,401 A | * | 1/1985 | Dobler et al. | 73/35.12 |
| 5,425,371 A | * | 6/1995 | Mischenko | 73/705 |
| 6,411,038 B2 | * | 6/2002 | Murai et al. | 315/55 |
| 6,539,787 B1 | * | 4/2003 | Murai et al. | 73/119 R |
| 6,575,039 B2 | * | 6/2003 | Murai et al. | 73/756 |
| 6,744,015 B2 | * | 6/2004 | Tanaka et al. | 219/267 |
| 6,823,738 B1 | * | 11/2004 | Wlodarczyk et al. | 73/705 |
| 2004/0182144 A1 | * | 9/2004 | Okazaki et al. | 73/118.1 |
| 2005/0061063 A1 | * | 3/2005 | Haussner et al. | 73/116 |
| 2005/0211214 A1 | * | 9/2005 | Tomita et al. | 123/145 A |
| 2005/0229685 A1 | * | 10/2005 | Sakamoto et al. | 73/115 |

FOREIGN PATENT DOCUMENTS

WO  WO 9817988 A1 * 4/1998

* cited by examiner

Primary Examiner—Edward Lefkowitz
Assistant Examiner—Freddie Kirkland, III
(74) Attorney, Agent, or Firm—James M. Deimen

(57) ABSTRACT

A pressure-sensing element for an internal combustion engine is located in the sleeve of a ceramic glow plug heater having axial and radial pressure channels connecting the sensor diaphragm to the combustion chamber. The sensor signal conditioner is encapsulated in an automotive-type connector either directly attached to the glow plug body or located at the end of a cable pigtail containing the sensor fibers and the heater positive potential wire. A high temperature rated fiber optic pressure sensor capable of measuring either dynamic or absolute pressure is used. The absolute pressure sensor relies on three optical fibers combined in a common ferrule in the sensor head area and connected to one light source (LED) and two detectors (photodiodes) in the signal conditioner area. The fibers can either be identical by being spaced unequally in the ferrule or can have different diameters, numerical aperatures, or both, and be spaced equally or unequally. The fiber parameters or their spacing are selected to maximize the difference in the response of the "measurement" and "reference" detectors to changing pressure.

7 Claims, 5 Drawing Sheets

GLOW PLUG INTEGRATED PRESSURE SENSOR

BACKGROUND OF THE INVENTION

This application claims the benefit of provisional patent application No. 60/545,459, filed Feb. 17, 2004.

The field of the invention pertains to diesel engines with pressure sensors adapted to directly measure individual cylinder pressures in real time.

Diesel engines can significantly benefit from cylinder pressure-based controls resulting in reduced harmful emissions, better fuel economy and drivability, and lower engine noise levels. Recently, as much as a 24% reduction in soot emissions and a 12% reduction of NOx emissions were demonstrated by a closed loop control of fuel injection timing and duration based on information provided by pressure sensors located in all engine cylinders. In passenger car and light duty truck engines, where glow plugs are used, a preferred way of introducing a cylinder pressure sensor into a combustion chamber is through a glow plug.

Applicant's fiber optic pressure sensors have been successfully used to measure the dynamic component of the combustion engine cylinder pressure. In the existing design based on two fibers applicant's sensor compensates for such error sources as LED temperature and aging effects, photodiode thermal dependence, fiber to LED/photodiode coupling dependence on temperature, as well as low frequency fiber bending. However, the current sensor only responds to the dynamic component of total cylinder pressure. Furthermore the present design does not compensate for light intensity changes associated with rapidly occurring fiber bending.

SUMMARY OF THE INVENTION

This invention teaches a novel glow plug with a built-in cylinder pressure sensor for use in diesel and other internal combustion engines. The pressure-sensing element is located in the sleeve of a ceramic glow plug heater having axial and radial pressure channels connecting the sensor diaphragm to the combustion chamber. The sensor signal conditioner is encapsulated in an automotive-type connector either directly attached to the glow plug body or located at the end of a cable pigtail containing the sensor fibers and the heater positive potential wire. A high temperature rated fiber optic pressure sensor capable of measuring either dynamic or absolute pressure is used.

The novel absolute pressure sensor of this invention relies on 3 optical fibers combined in a common ferrule in the sensor head area and connected to one light source (LED) and two detectors (photodiodes) in the signal conditioner area. The fibers can either be identical but spaced unequally in the ferrule or can have different diameters, numerical apertures, or both and be spaced equally or unequally. The fiber parameters or their spacing are selected to maximize the difference in the response of the "measurement" and "reference" detectors to changing pressure.

The sensor output is derived from the detectors' ratio resulting in the rejection of the common mode errors, such as LED output temperature dependence and aging, fiber bending, or thermal dependence of fiber to LED or photodiode coupling. For maximum linearity and sensitivity the sensor output is proportional to the ratio of the measurement detector signal divided by a difference of the measurement detector signal and the reference detector signal multiplied by a constant factor. This factor is selected for each sensor in such a way that the ratio denominator is independent of pressure resulting in an absolute pressure sensor with high linearity.

DESCRIPTION OF THE PREFERRED EMBODIMENTS

Figure 1:
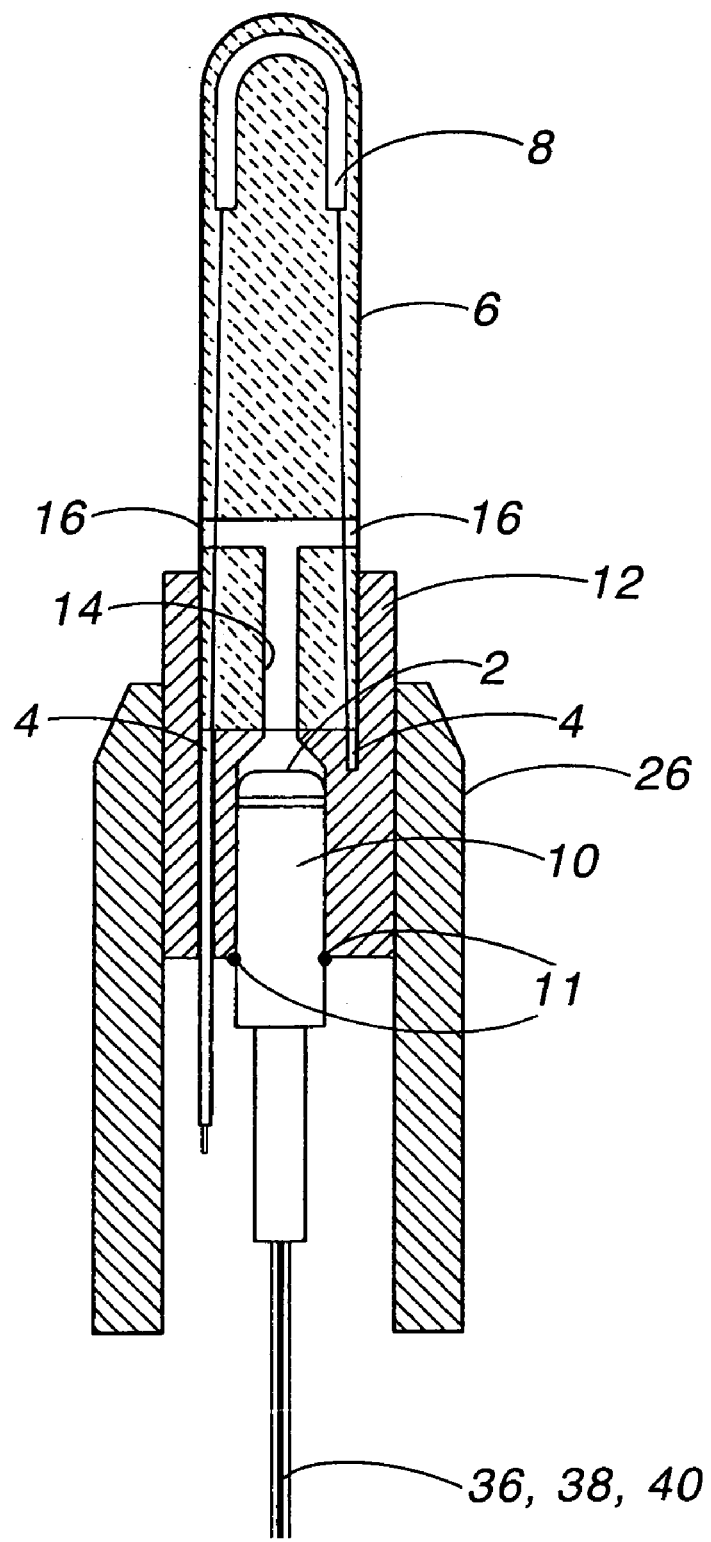
FIG. 1 illustrates in cross-section a ceramic glow plug having the new sensor therein.
Figure 2:
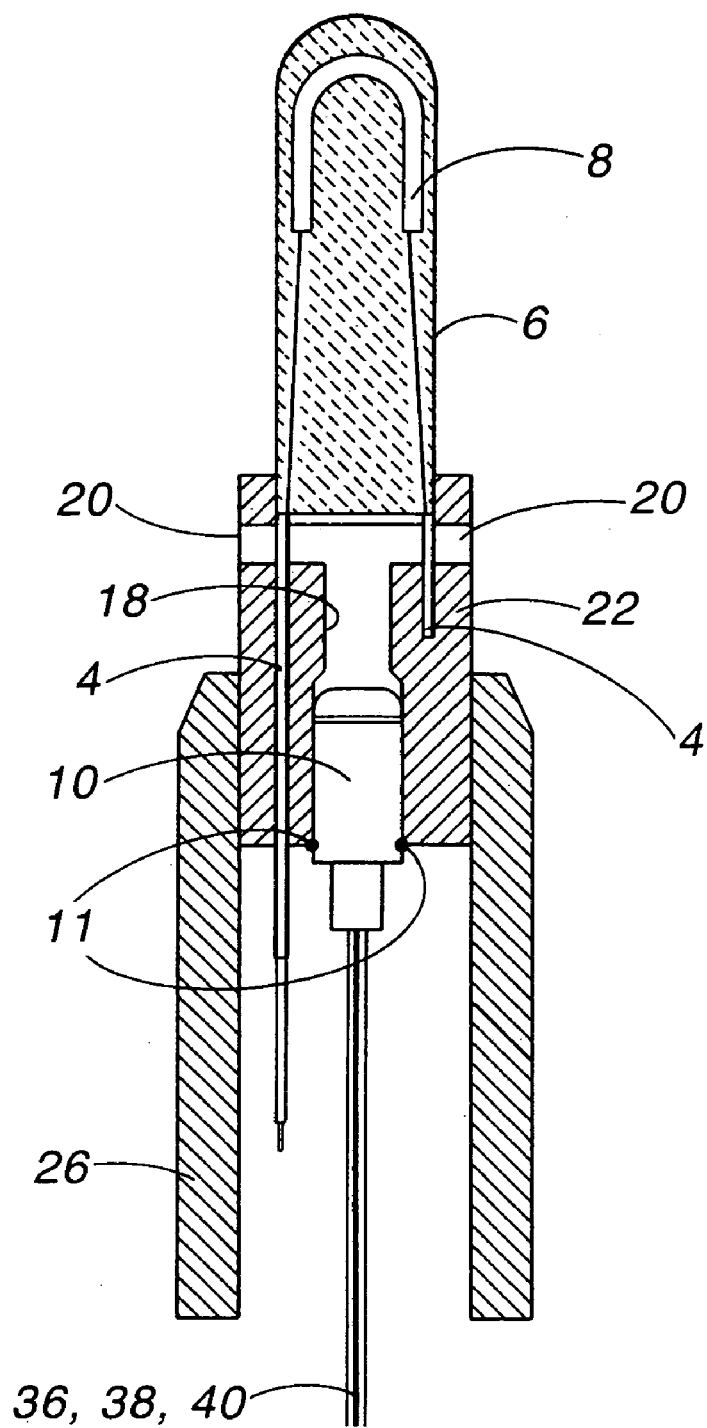
FIG. 2 illustrates in cross-section a ceramic glow plug having an alternative configuration for the new sensor therein.

This invention teaches a number of designs for a glow plug 6 with a built-in cylinder pressure sensor having a pressure-sensing element 10 mounted close to the ceramic heater 8 and heater wires 4 and with an axial bore and radial passages connecting the sensing element to the combustion chamber. The sensing element 10, sealed and welded 11 into a bore of the metal heater sleeve 12, is exposed to combustion gases in one of the two ways shown in FIG. 1 and FIG. 2. In the embodiment of FIG. 1, an axial bore pressure channel 14 and one or multiple radial holes 16 are located in the ceramic heater itself. By having the radial holes 16 located in the mid/upper section of the glow plug, high temperature in this area minimizes potential for soot clogging. In the design shown in FIG. 2, the axial channel 18 and the radial holes 20 are located in the glow plug metal sleeve 22. In order to minimize potential for soot deposits the radial holes 20 are located as close as practical to the top section of the sleeve 22—for maximum temperature in the area where the holes are located.

A diaphragm-type 2 intensity-modulated fiber optic pressure 10 sensor capable of measuring either dynamic pressure (previously patented by applicant) or a novel absolute pressure sensor is used. When a dynamic sensor is utilized the total cylinder pressure is established as the sum of a dynamic sensor output and the output of the Manifold Absolute Pressure (MAP) sensor. No MAP sensor is required when an absolute cylinder pressure sensor is used.

Figure 3A:
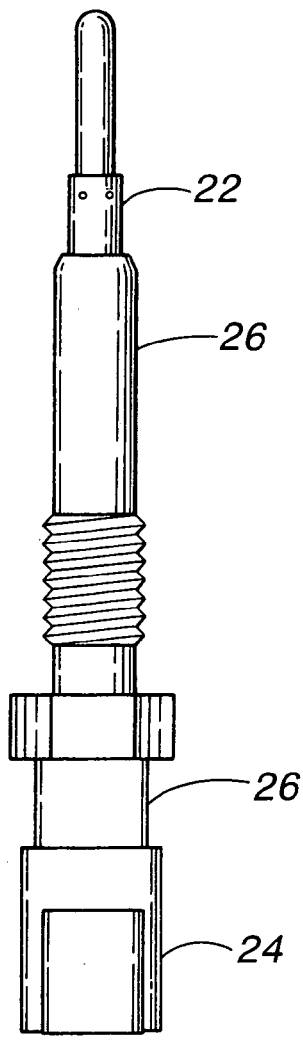
FIG. 3A illustrates the external appearance of the ceramic glow plug of FIG. 2.
Figure 4:
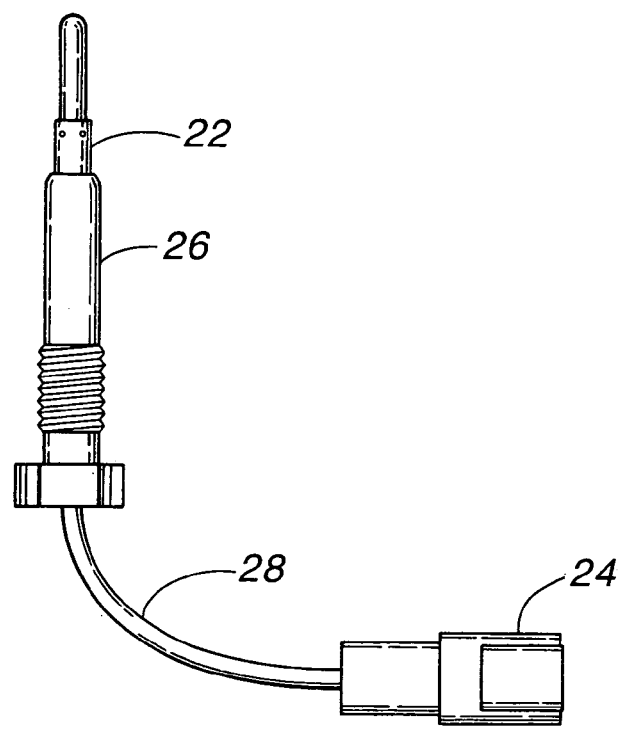
FIG. 4 illustrates a pigtail glow plug connector.
Figure 3B:
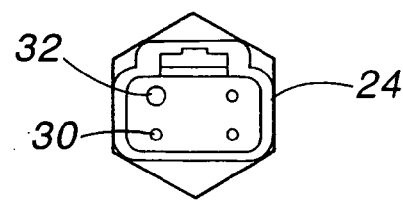
FIG. 3B illustrates the directly attached glow plug connector.

The absolute pressure sensor of this invention is based on three fibers cemented in a common ferrule in the sensor head area and connected in the signal conditioner section to a light source (LED) and two detectors (photo diodes). Compared to the dynamic sensor the purpose of the extra fiber and detector of the absolute sensor is to provide a "reference" channel required for cancellation of the common mode errors of the "measurement" and "reference" signals. In an "ideal" design the measurement and reference signals should behave identically under the effect of interfering factors but show maximum difference in their responses to pressure. In a preferred embodiment, "self-aligning" LED and photodiodes are used, as described in U.S. Pat. No. 6,758,086 by this applicant, for high LED coupling efficiency, thermal stability, and fiber-to-photodiode coupling consistency. Due to the miniature size of the "self-align" devices the sensor signal conditioner can be encapsulated into an automotive-type connector 24, either directly attached to the glow plug body 26 or located at the end of a pigtail cable 28 containing the sensor fibers 36, 38, 40 and the heater wire 4, as shown in FIG. 3 and FIG. 4, respectively. Three 30 (smaller diameter) out of four pins of the connector are for the sensor (power, ground, and output) while the fourth (larger in diameter) pin 32 is for the glow plug positive potential heater wire 4.

Figure 5:
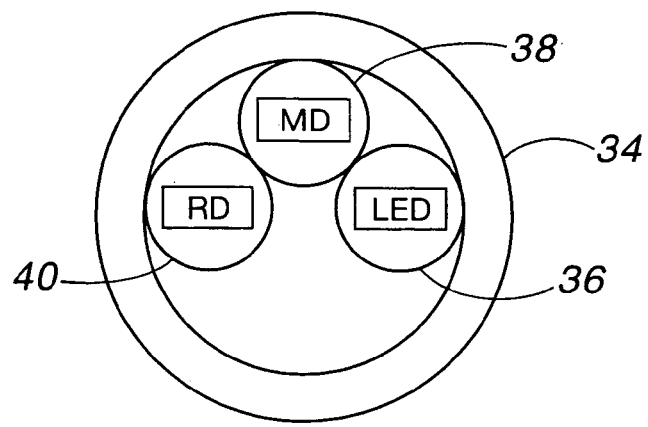
FIG. 5 illustrates a ferrule arrangement for the optical fibers.
Figure 6:
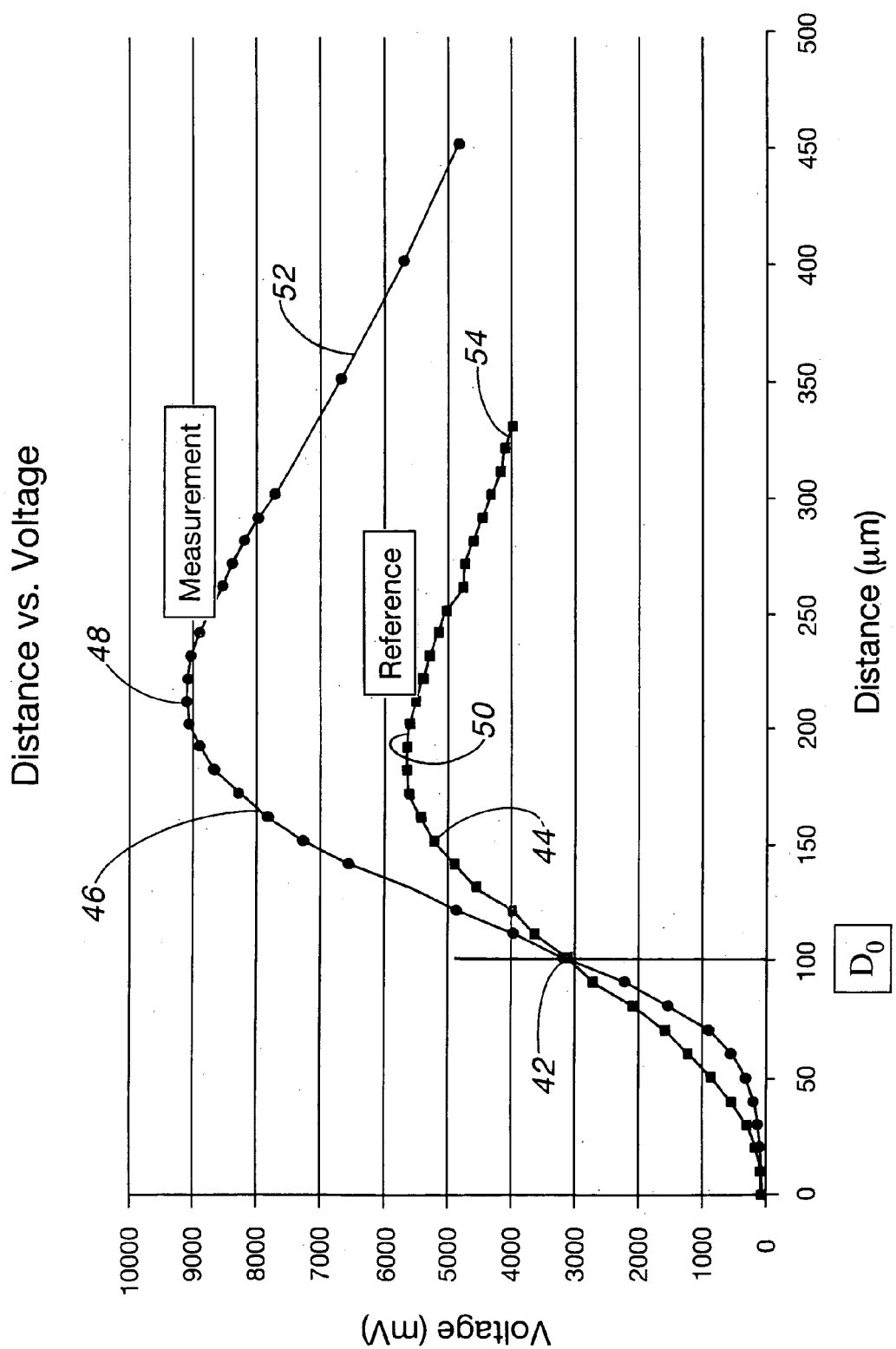
FIG. 6 is a graph of diaphragm distance versus voltage for the new sensor.

The differential response of the measurement and reference detectors is due to the different responses of the two fiber pairs (formed by three fibers) to diaphragm deflection. The different responses are either due to different core, cladding, or buffer diameters of the fibers used, or their different numerical apertures, or all of the above. Alternatively, identical fibers can be cemented in the ferrule 34 such that their spacing is different between the two pairs, as shown in FIG. 5. The position of the fibers connected to the light emitting diode (LED) 36, measurement detector (MD) 38, and reference detector (RD) 40 are shown. The response of the measurement and reference detectors to changing diaphragm to fiber distance is shown in FIG. 6 for a sensor having fibers spaced as in FIG. 5. It is to be noted that in this invention all the fibers have their ends located the same distance from the sensor diaphragm.

Depending on the distance between the fibers ends and the diaphragm Do (set during sensor assembly), the measurement and reference detectors can respond differently to pressure. When the fibers are located in the ascending region 42 of the two curves, the outputs of both detectors decrease with pressure (fiber to diaphragm distance is reduced). When fibers are positioned near the reference curve peak location 44, the reference signal changes little with pressure while the measurement signal 46 decreases with increasing pressure. Conversely, when the fibers are located near the measurement curve peak 48, the reference signal 50 increases with increasing pressure. Finally, when fibers are located sufficiently away from the diaphragm, both measurement 52 and reference signals 54 increase with increasing pressure.

In a preferred design, the fiber to diaphragm distance of this novel sensor is set in the ascending part 42 of the curves at a point of maximum slope and linearity of the measurement channel $D_0$. The radial separation between the fibers, or their dimensions and/or numerical aperture, are selected in such a way that the reference signal responds linearly to pressure for a given fiber location $D_0$. For example, the optimum fiber location is approximately 100 microns ($D_0$) away from the diaphragm for the fiber tip shown in FIG. 5.

If the measurement ($V_m$) and reference ($V_r$) signals depend linearly on pressure, then their dependencies can be expressed as:

$$V_i = I_c(v_{oi} + S_i \times p), \text{ for } i = m, r, \tag{1}$$

where $v_{oi}$ and $S_i$ are the offset voltage and sensitivity, respectively, of the measurement (m) or reference (r) signals. $I_c$ is a pressure independent factor common to both channels and is a multiplicative product of LED intensity ($I_{LED}$), LED-to-fiber coupling efficiency ($C_{LED}$), fiber-to-detector coupling efficiency ($C_p$), detector sensitivity ($D_p$), diaphragm reflectivity (R), and the square of the fiber transmission (T):

$$I_c = I_{LED} \times C_{LED} \times C_p \times D_p \times R \times T^2. \tag{2}$$

In a novel approach of this invention the sensor output is derived from the ratio of the measurement signal divided by the difference of the measurement signal and the product of the reference signal and a constant factor F:

$$V_{out} \sim V_m / (V_m - F \times V_r). \tag{3}$$

For maximum linearity of the sensor response the factor F is selected in such a way that the denominator of Eq. (3) is independent of pressure. From Eqs. (3) and (1) the value of F can be established then as:

$$F = S_m / S_r \tag{4}$$

resulting in the linear response of the sensor:

$$V_{out}(p) \sim (v_{om} + S_m \times p) / (v_{om} - S_m / S_r \times v_{or}) \tag{5}$$

Figure 7:
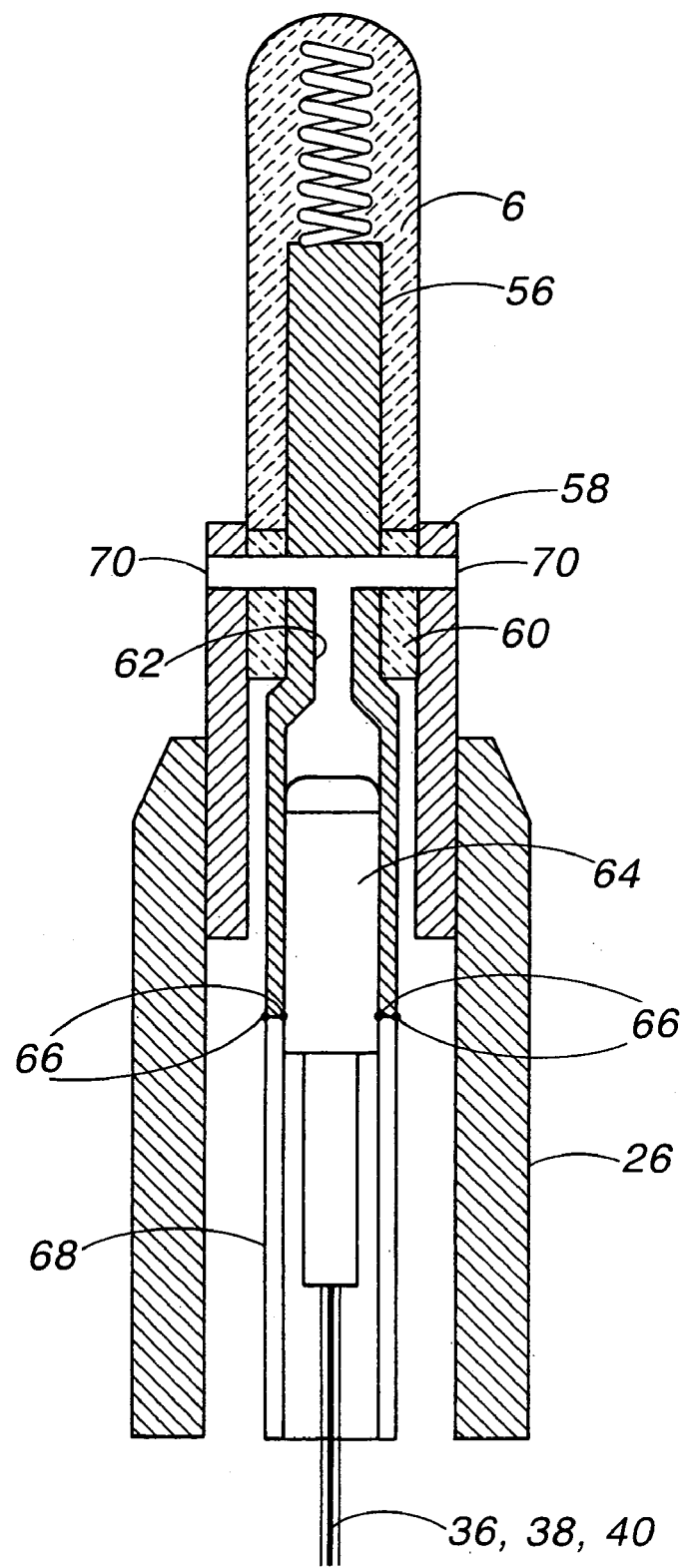
FIG. 7 illustrates in cross-section a ceramic glow plug having an alternative construction for the heater and new sensor therein.

Illustrated in FIG. 7 is a ceramic glow plug 6 having a central electrode 56 that extends through the metal sleeve 58 but is separated therefrom by a ceramic sleeve electrical insulator 60. The central electrode 56 is formed with an axial bore 62 or channel that broadens out to retain the sensing element 64, in turn sealed and laser welded into the electrode at 66. The laser welds 66 also retain the electrical conductor tube 68 to the central electrode 56. Radial holes 70 for combustion gases pass through both the metal sleeve 58 and the ceramic sleeve 60.

The invention claimed is:

1. An internal combustion engine glow plug comprising a heater shell, a heater enclosed within the shell and a glow plug body for supporting the heater and heater shell in an engine, an axial bore channel within the glow plug and at least one radial hole communicating at one end with the axial bore channel and so located as to communicate at the other end directly with an engine combustion chamber, a pressure sensor located in the glow plug and having a diaphragm thereon, said diaphragm being exposable to combustion gases entering the radial hole and axial bore channel, a heater sleeve attaching the heater shell to the glow plug body, said axial bore channel being formed in the heater and said radial hole being at least partially formed in the heater and passing through the heater sleeve, and a ceramic sleeve located between the heater and the heater sleeve.

2. An internal combustion engine glow plug comprising a heater shell, a heater enclosed within the shell and a glow plug body for supporting the heater and heater shell in an engine, an axial bore channel within the glow plug and at least one radial hole communicating at one end with the axial bore channel and so located as to communicate at the other end directly with an engine combustion chamber, a pressure sensor located in the glow plug and having a diaphragm thereon, said diaphragm being exposable to combustion gases entering the radial hole and axial bore channel, said pressure sensor being an absolute pressure sensor, the output of the absolute pressure sensor comprising a measurement signal and a reference signal, and wherein the absolute pressure sensor includes three optical fibers terminating with ends in a ferrule, the optical fiber ends being spaced from the diaphragm.

3. The engine glow plug of claim 2 wherein the distance between the ends of the first and second optical fibers differs significantly from the distance between the ends of the first and third optical fibers.

4. The engine glow plug of claim 3 wherein the pressure response of the absolute pressure sensor may be substantially represented by the expression:

$$V_{out}(p) \sim (v_{om} + S_m \times p)/(v_{om} - S_m/S_r \times v_{or}).$$

5. An internal combustion engine of glow plug comprising a heater shell, a heater enclosed within the shell and a glow plug body for supporting the heater and heater shell in an engine,
- an axial bore channel within the glow plug and at least one radial hole communicating at one end with the axial bore channel and so located as to communicate at the other end directly with an engine combustion chamber,
- a pressure sensor located in the glow plug and having a diaphragm thereon, said diaphragm being exposable to combustion gases entering the radial hole and axial bore channel,
- said pressure sensor being an absolute pressure sensor, the output of the absolute pressure sensor comprising a measurement signal and a reference signal, and wherein the pressure response of the absolute pressure sensor may be substantially represented by the expression:

$$V_{out}(p) \sim (v_{om} + S_m \times p)/(v_{om} - S_m/S_r \times v_{or}).$$

6. An internal combustion engine glow plug comprising a heater shell, a heater enclosed within the shell and a glow plug body for supporting the heater and heater shell in an engine,
- an axial bore channel within the glow plug and at least one radial hole communicating at one end with the axial bore channel and so located as to communicate at the other end directly with an engine combustion chamber,
- an absolute pressure sensor located in the axial bore channel and having a diaphragm thereon exposable to combustion gases entering the radial hole and axial bore channel, and
- a ferrule in the absolute pressure sensor having at least three optical fibers terminating with ends spaced from the diaphragm.

7. The engine glow plug of claim 6 wherein the output of the absolute pressure sensor comprises a measurement signal and a reference signal.

* * * * *